United States Patent [19]

Nelson et al.

[11] Patent Number: 4,692,883
[45] Date of Patent: Sep. 8, 1987

[54] AUTOMATIC DIGITAL WAVELENGTH CALIBRATION SYSTEM FOR A SPECTROPHOTOMETER

[75] Inventors: Michael R. Nelson, Downers Grove; Roy E. Boostrom, Elmhurst, both of Ill.; Jerry E. Cahill, Trumbull, Conn.; Tzong Hwang, Villa Park, Ill.

[73] Assignee: The Perkin-Elmer Corporation, Norwalk, Conn.

[21] Appl. No.: 704,356

[22] Filed: Feb. 21, 1985

[51] Int. Cl.$^4$ .................. G01C 25/00; G06F 15/46
[52] U.S. Cl. ................................ 364/571; 356/319; 364/497; 364/525
[58] Field of Search ............... 364/525, 526, 571, 579, 364/497; 356/230, 232, 305, 319, 395

[56] References Cited

U.S. PATENT DOCUMENTS

| | | | |
|---|---|---|---|
| 3,646,331 | 2/1972 | Lord | 364/526 X |
| 3,922,091 | 11/1975 | Suva et al. | 356/319 |
| 4,249,244 | 2/1981 | Shofner et al. | 364/571 X |
| 4,323,309 | 4/1982 | Akitomo et al. | 364/571 X |
| 4,488,811 | 12/1984 | Fukuma | 356/319 |

Primary Examiner—Felix D. Gruber
Assistant Examiner—Kevin Teska
Attorney, Agent, or Firm—Ronald G. Cummings; Francis L. Masselle; Edwin T. Grimes

[57] ABSTRACT

This invention is directed to a digital wavelength calibration system for a spectrophotometer, which includes a photodiode array that forms an output detector for the spectrophotometer, a light source for generating at least one reference emission line of known peak wavelength, a computer controlled mechanism for causing the peak of said reference line to fall in close proximity to the center of a preselected pixel of said photodiode array, peak location computing apparatus for computing the exact position data of the peak relative to the pixel center in terms of the pixel spacing and the ordinal number of the preselected pixel and for retaining this position data for subsequent wavelength computation, wavelength identification computing apparatus for computing the numerical relationship data of the ordinate number of each pixel to the wavelength falling on that pixel and for retaining this relationship data for subsequent correlation with data generated by the pixel, and apparatus for computational processing and display of the data correlated with the associated wavelength value.

8 Claims, 6 Drawing Figures

AUTOMATIC DIGITAL WAVELENGTH CALIBRATION SYSTEM FOR A SPECTROPHOTOMETER

FIELD OF THE INVENTION

This invention relates to spectrophotometry and, more particularly, to a computer controlled system for calibration of a spectrophotometer using a photodiode array as the measuring device.

BACKGROUND OF THE INVENTION

The development of a photodiode array (PDA) capable of acting as a photodetector over a wide spectral range as dispersed by a monochromator and sequentially reading out the intensity of separate wavelengths within this range by digital means has revolutionized the operation of scanning spectrophotometers. The multiple, linearly disposed elements of the PDA take the place of the exit slit and eliminate the need for mechanical scanning. However, because of the microscopic dimensions of these elements, extreme accuracy in location of the spectrum on the array has been required in order to maintain the correct wavelength on each element to be correctly reported on the readout display.

If the position of the spectrum is fixed, the array wavelength calibration is a matter of initial adjustment and requires proper design to eliminate secular changes due to temperature expansion, creep of structural materials, etc. If more than one value of dispersion is to be provided for higher resolution over shorter wavelength ranges, then a means of reestablishing wavelength calibration becomes essential.

It is an object of this invention to provide automatic microprocessor controlled means to establish initial wavelength calibration for a multiplicity of wavelength ranges and resolutions.

It is a further objective to have this initialization system incorporate checks of internal consistency of the instrument including corrections for temperature drifts and other changes affecting wavelength determination.

It is a further objective to make this wavelength establishing procedure available at any time to the operator through a single command.

It is yet a further objective to make this procedure programmable so as to be automatically called up whenever required including, for example, at turn-on and at appropriate times during operation.

Another objective of this system is to use an accurate emission line of known wavelength as the wavelength reference rather than any mechanical index.

Another objective is to provide in software, corrections for nonlinearity of the wavelength scale as projected on the linear array.

It is also an objective to make adjustments by the operator unnecessary.

Yet another objective is that any automatic adjustment be made through software rather than by mechanical motions.

It is also part of the object that the procedure be selfindexing and self-optimizing.

BRIEF DESCRIPTION OF THE INVENTION

The spectrophotometer of the invention comprises deuterium and tungsten light sources; suitable optical filters for adjusting optical beam intensity level, minimizing stray light and for order sorters; sample holder means; and a monochromator associated with a photodiode array (PDA) which serves as the monochromator exit slit. In effect, the PDA comprises a multiplicity of narrow, rectangular photocell elements, side by side, each receiving a narrow band of wavelengths from the dispersed monochromator spectrum. Thus, the PDA delivers a sequentially scanned series of discrete signals each corresponding to the spectral output of a particular segment of the spectrum. In the preferred embodiment herein set forth, the dispersion means of the monochromator comprises either of two diffraction gratings of different grating spacing, which can be interchanged mechanically so as to provide either a high dispersion for high precision work or a lower dispersion for survey work. In the survey mode the PDA receives the whole wavelength range of the instrument, eg. 190 to 900 nanometers (nm) simultaneously, being electronically scanned to output a spectral response curve covering that range for display. In the high precision mode only and abbreviated wavelength range, eg. 100 nm, is covered and scanned by the array.

Selection of the particular range is effected through operator command. The grating interchange involves moving parts and therefore possible mechanical indexing variations. The invention involves means through which automatic computer controlled and adjusted wavelength indexing corrects for mechanical shifts and makes possible accurate and reliable use of the PDA in a precision high speed scanning spectrophotometer.

The PDA used in this instrument, which may for example be a Reticon RL512S, receives the spectrum on 512 parallel photosensitive bars or photodiodes, each bar or pixel being 2.5 mm long and spaced 25 $\mu$m from adjacent pixels. The small pixel width makes extreme precision necessary in proper placement of the spectrum for wavelength readout accuracy. This placement can be affected by mechanical variations in the monochromator, variations in the wavelength drive, temperature induced distortion of mechanical members, etc. The invention provides rapid, automatic digital correction of spectrum placement whenever required. The reference means used is to locate the zero order and subsequently the deuterium emission line at 656.1 nm available from the ultraviolet light source, on known pixels of the PDA, thus indexing the position and slope of the wavelength scale. A detailed description of how this is accomplished by digital computer means will be given later in this disclosure.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciatae that the conception on which this disclosure is based may readily be utilized as the basis of the defining of other assemblies and routines for carrying out the various purposes of the invention. It is important, therefore, that this disclosure be regarded as including such equivalent assemblies and routines as do not depart form the spirit and scope of the invention.

One embodiment of the invention has been chosen for purpose of illustration and description, and is shown in the accompanying drawings forming a part of the specification.

DETAILED DESCRIPTION OF A PRESENTLY PREFERRED EMBODIMENT OF THE INVENTION

Figure 1:
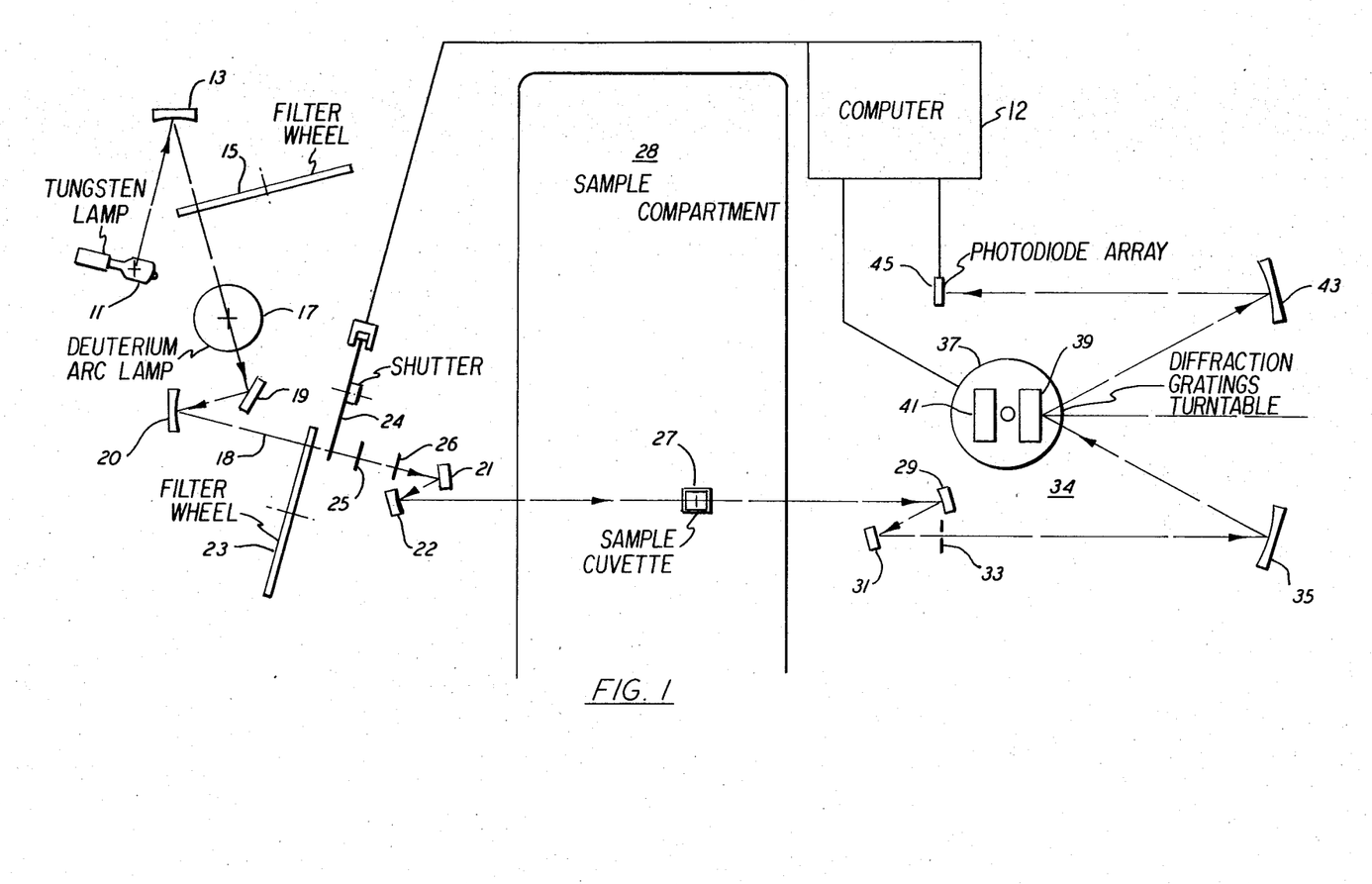
FIG. 1 shows a simplified schematic view of the optical system of out preferred embodiment.

Referring to FIG. 1 a prefocussed tungsten halide lamp 11 provides visible and near infrared radiation, which is concentrated by condenser mirror 13 on an aperture through the anode of a deuterium arc lamp 17. A segmented three position filter wheel 15 is driven by a stepper motor (not shown) in accordance with computer command to intercept or modify radiation wavelengths from the tungsten source, which would be a source of stray light for the wavelength range in use. The deuterium arc lamp 17 provides the ultraviolet wavelengths of the spectral range and is also the source providing the calibrating reference wavelength at 656.1 nanometers. When operating only in the UV, the tungsten source 11 is cut off by filter wheel 15.

Radiation from the source lamps is redirected by a flat mirror 19 and concentrated at apertures 25 and 26 by a concave mirror 20 after passing through a second filter wheel 23, which carries three filters and an open aperture for attenuating unwanted grating orders and adjusting the light level at selected spectral ranges so as not to overload the photodiode array. The PDA will be discussed in detail later. An optical shutter 24 for use in background dtermination and for blocking the optical beam 18 as required is located adjacent the filter wheel 23.

The two apertures 25 and 26 are for controlling the beam cross-section when traversing the sample cuvette 27. Flat mirror 21 redirects the beam to concave mirror 22 which images the two apertures in the proper locations in the sample compartment 28 to effectively control the beam size as it passes through the cuvette without impingement on the cuvette walls or other loss in optical flux intensity. The cuvette may thus have an optical thickness from about 10 to about 100 mm, for example.

After passing through the cuvette the optical beam is imaged by concave mirror 29 at the entrance slit 33 of the monochromator 34, being directed thereto by flat mirror 31.

The monochromator of this preferred embodiment is shown as a Czerny-Turner type utilizing a choice of either of two plane diffraction gratings as the dispersing device. While the Czerny-Turner monochromator is herein used for its simplicity and low abberation at the output image plane it is, of course, possible to use another type of monochromator while still practicing the indexing and calibration procedure of this invention. In the monochromator of FIG. 1, collimator mirror 35 parallelizes the beam from the slit 33 and directs it to a plane diffraction grating 39 mounted on a rotatable turntable 37. A second mirror 43, similar to mirror 35, receives a first order dispersed beam from the grating and images it on the face of the PDA 45. Each photosensitive strip or pixel on the PDA acts as an individual exit slit and responds to a narrow wavelength band of the dispersed spectrum.

FIG. 1 shows the optical beam impinging on the grating 39, which may be designated as a "Survey" grating. This grating in this embodiment has 100 lines or grooves per mm and its dispersion at the plane of the face of the PDA is such that the designed wavelength range, 190 to 900 nm, substantially covers the length of the array pattern. If this were the only grating to be used all components of the monochromator and the PDA could be mechanically fixed. However, in this case, the resolution of the system would also be fixed about 1.5 nm by the pixel width. Since 1.5 nm resolution is deemed to be inadequate for many analyses a second "High Precision" grating 41 of 600 lines/nm is provided which may be interchanged with the Survey grating by mechanical means to be discussed presently. This High Precision grating 41 spreads the spectral wavelength band out six times as long as does the Survey grating 39 so that approximately 118 nm covers the same length of the array pattern as is covered by the 710 nm range of the Survey grating. The resolution is then $1.5 \div 6 = 0.25$ nm, which gives much more useful precision in analysis. However, associated with this increased precision is the necessity of providing a very accurate means of locating the wavelengths in either the Survey or the seven 118 nm High Precision bands.which, with overlaps, cover the total 190 to 900 nm range in the High Precision mode. As will be seen in this disclosure, the exactitude required for setting and displaying each band requires computer assistance to arrive at the correct wavelength values. The means by which this aid is accomplished is an important feature of this invention as hereinafter set forth.

Figure 2:
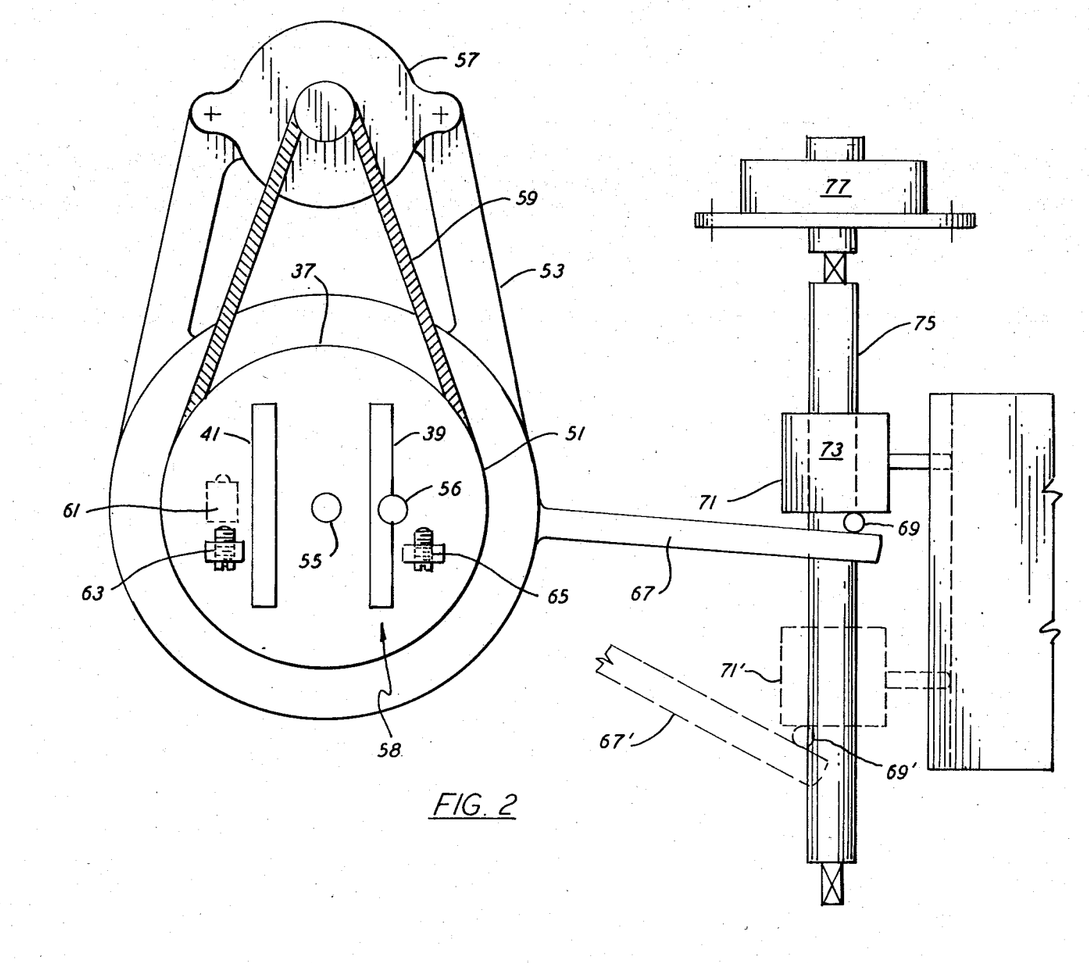
FIG. 2 shows a side elevation of the grating assembly.

To clarify the mechanical means of changing wavelength, reference is now made to FIG. 2. The two gratings, 39 and 41, are mounted in a conventional manner on the grating turntable 37 with the usual mechanical adjustments provided for grating tilt, skew, etc. familiar in the art and hence not delineated in the figure. The turntable is supported parallel to a grating carriage 53 by a central bearing system by shaft 55. In practice all bearings are high precision, low torque bearings comprising spring loaded balls or the like to entirely eliminate side or end play which would be unacceptable in a precision mechanical adjustment system.

The grating carriage carries a stepper motor 57 linked with the turntable 51 by a drive belt 59, which may be, for example, an endless loop of helical coil spring. Energizing the motor to rotate in a counterclockwise direction, as viewed in the figure, rotates the grating turntable relative to the grating carriage until a stop 61 on the turntable contacts a preadjustable stop screw 63 mounted on the grating carriage, thus bringing the grating 39 precisely into the active grating operating position as indicated by the arrow 58. Rotating the motor clockwise will alternatively bring the grating 41 into the active grating operating position 58 precisely located by preadjusted stop screw 65.

The grating carriage also carries a radial arm 67 having a length adjustment (not shown) which bears through a sliding bearing 69 on the face 71 of a precision nut 73 which is threaded onto a micrometer class precision screw 75 driven by a stepper motor 77. This drive system constitutes the well known sine drive commonly used for wavelength adjustment in monochromators and needs no further explanation to one skilled in the art. When the wavelength arm 67 swings over the wavelength range in the High Precision mode to position 67', the whole grating carriage, including the motor 57, rotates with the arm about an axis 56 located in the plane of the active grating face. This rotation swings the active grating, thus causing the spectrum to translate across the face of the PDA.

Figure 3:
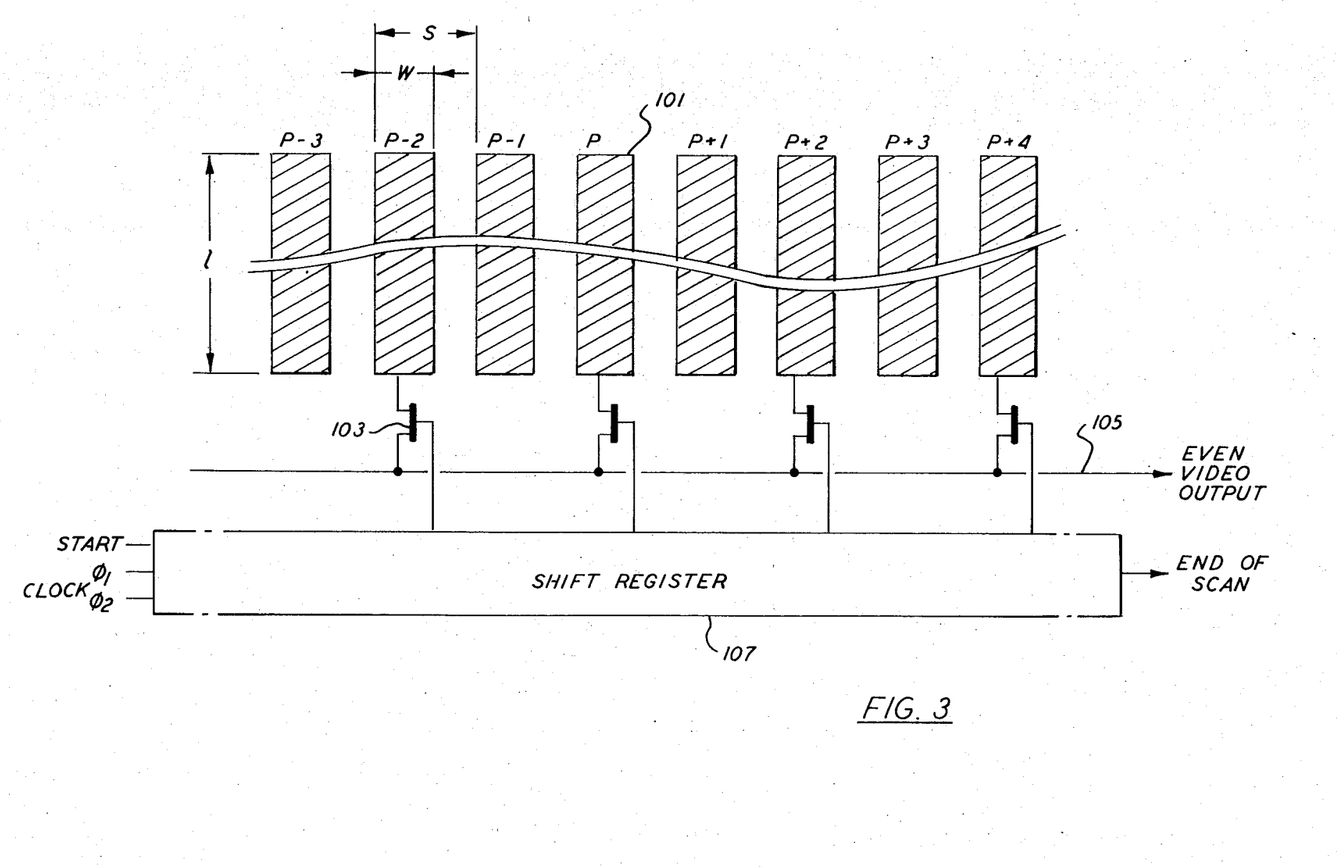
FIG. 3 shows a schematic diagram of the photodiode array (PDA)

Details of the PDA will be clarified by reference to FIG. 3, which shows a simplified representation of the photodiode array. The whole array is contained on a monolithic silicon ship a little over 13 mm long. The photosensitive elements, also known as pixels, 101 of the array used in this embodiment, available commercially as Reticon RL512S, have a length "l" of 2.5 mm, a spacing "s" of 25 micrometers and are 512 in number. The pixels are scanned by being connected in rapid sequence through digital switches 103 activated by shift register 107 to a common output line 105. To minimize outside interference and noise and to permit balancing out dark current effects alternate pixels are scanned through identical separate output scanning circuits. Only the circuit for even numbered pixels is shown for clarity in FIG. 3.

In scanning each full scan cycle delivers a series of 512 data values, each representing a different wavelength, to the computer for subsequent storage in a buffer. Total scan time is less than 0.1 seconds for acquisition and less than 2 seconds to display, including computer processing.

The 25 μm spacing between pixels is the mechanical factor setting resolution capability of the spectrophotometer and limiting wavelength accuracy. It will be apparent that the digital control system must be able to establish the base or index wavelength setting not only rapidly but also to a very high degree of mechanical precision. Otherwise the whole advantage of operation with the PDA will be vitiated by erratic wavelength errors.

Before describing in detail the automatic computer commanded initialization and calibration procedure it should be noted that the system of this embodiment is aligned mechanically and preadjusted in the conventional manner as part of the production routine. If this production calibration could be preserved permanently to a sufficient degree of precision a relatively simple set of index stops might suffice from which all subsequent settings could be extended. However, such a simple set of conditions is not effective in real time especially where such small mechanical dimensions are concerned. Temperature changes cause parts to expand or contract and shift their position. Materials creep with like results. Dirt or corrosion can cause mechanical errors. For these and similar other reasons a calibration system of this precision must be self checking and correcting to be permanently effective. The system of this invention, it will be shown, meets this requirement in a novel and effective way with computer assistance.

Initialization of the spectrophotometer is programmed to occur automatically when the instrument is first turned on. The program comprises several functions which may be stated briefly as follows:

First, the computer 12 contained in the instrument must establish if the instrument is operating properly. This is done by the computer attempting to perform a command routine which will calibrate the gratings for survey and High Precision modes. Then multiple scans of the survey region will be made to verify signal and temperature stability. Scans of all grating positions will then be made and the data validated against reasonable limits. Finally, wavelength calibration tables will be generated for the survey and high Precision regions and stored for subsequent use.

If any part of this initialization procedure cannot be accomplished an error message designating the nature of the fault will be displayed by the computer.

To better clarify and set forth the different functions accomplished by the computer, each of these functions will be discussed herein separately. Since, as will be apparent to one skilled in the art, subroutines for the accomplishment of each of these functions can be programmed in a number of possible ways, it is deemed unnecessary to this discussion to set forth particular source code for each of these subroutines. Rather, a statement of the object to be accomplished and the steps by which the computer acts would be exemplary.

The computer functions pertinent to this invention may be considered as follows:
1. Peripheral Activities and Initialization Routine
2. Data Acquisition and Peak Location
3. Survey Mode Calibration
4. High Precision Mode Calibration Each of these functions comprises a series of commands to be discussed hereinafter.

1. Peripheral Activities and Initialization Routine

Peripheral Activities of the computer include simple condition commands such as opening or closing shutter 24 (FIG. 1) or turning on or off the tungsten lamp 11 or the deuterium lamp 17. Device control commands may activate individual devices or setups such as control of the stepper motors which locate filter wheels 15 and 23 (FIG. 1), the grating selection motor 57 and the wavelength drive motor 77 (FIG. 2). Device control commands such as "Scan" may command sequential movement of several devices to set up a specific type of scan. In any case an immediate simple response is returned to the computer when the command is received, followed by a second response when the command has been completely executed. Where the command is one of a sequence the second response initiates the performance of the next command of the sequence.

The initialization sequence as controlled by the computer may be briefly outlined in the following steps.

a. The computer first resets both filter wheels to stop position.

b. The shutter opens. The filter 15 (FIG. 1) goes to a non-transmitting or closed position. The filter 23 goes to an attenuator (frosted glass) position to reduce the intensity of the optical beam for location of the grating zero order. The High Precision grating goes to the grating operating position 58 (FIG. 2). The wavelength motor drives toward zero end beginning a stepwise search for the zero order peak. This search comprises alternate drive and scan cycles until the zero order peak is located as nearly on pixel 262, the center pixel of the array, as possible.

c. When the zero order peak is found and positioned on the correct pixel of the array the filter 23 goes to the near infrared position (orange glass). The wavelength motor is driven the correct number of counts to center the 650 nm wavelength position on the array. The wavelength drive then begins a stepwise search to locate the 656.1 deuterium line as near to pixel 278 center as practical. The High Precision Mode Calibration routine proceeds as described in detail later in this discussion.

d. When the High Precision mode calibration is satisfactorily completed the filter 23 remains where it is to control neighboring false peaks. The filter 15 goes to its open position. The grating table rotates to bring the Survey grating into the active operating position. The wavelength drive motor is driven by count to the Survey position. The shutter opens and the filter 15 goes to the blocked position and then to a light blue flattening filter position. The filter 23 now moves to the neutral filter position and the shutter closes. Execution of the Survey Mode Calibration routine now proceeds as described in detail subsequently in this discussion.

2. Data Aquisition and Peak Location

Figure 4A:
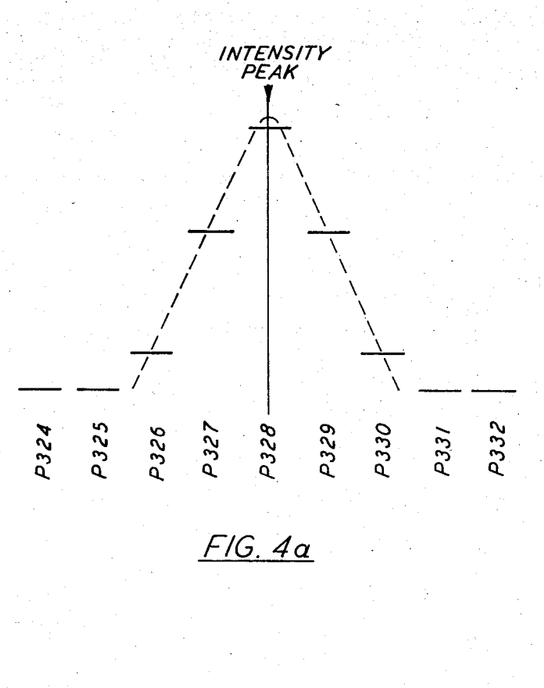
FIGS. 4 and 4b show plats of the peak locations with respect to the pixel locations.
Figure 4B:
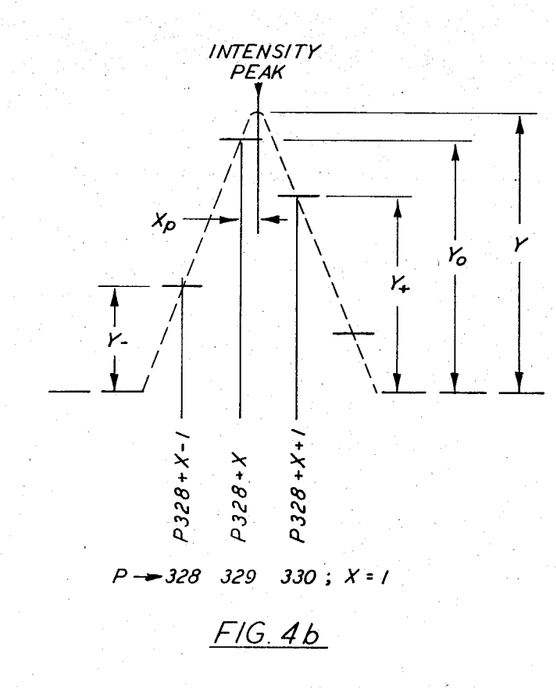
Figure 5:
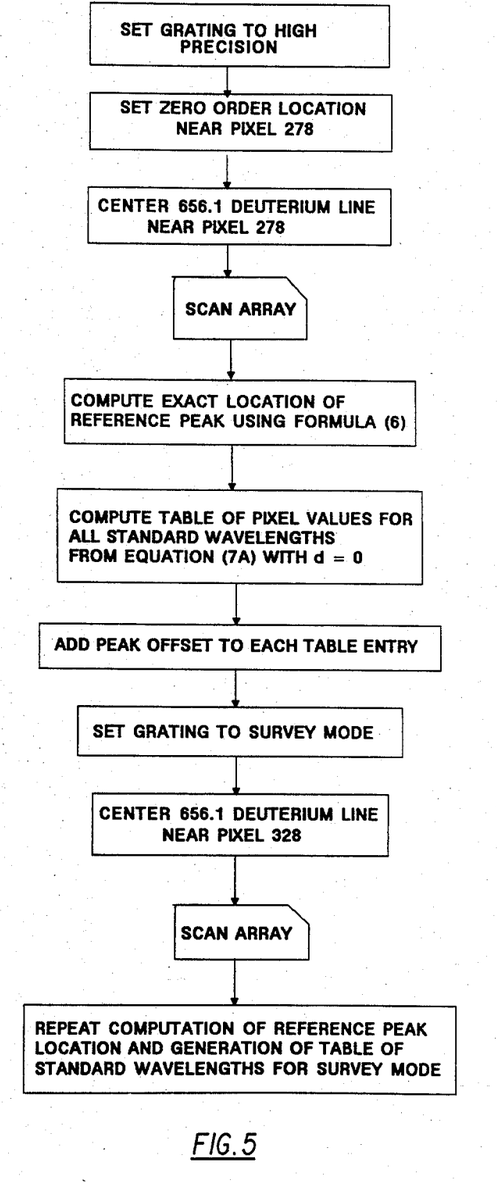
FIG. 5 shows a flowchart of the illustrated embodiment.

The "get data" command initiates the scanning of the diode for a selected number of scans which are accumulated in the appropriate memory buffer. Each data word is acquired from a specific pixel in the array. FIG. 4 shows how such data can be displayed on an oscilloscope screen. The illustration shows the response from a narrow wavelength line such as the 656.1 nm deuterium line used as a wavelength reference. In FIG. 4A the peak of the wavelength reference line falls on pixel "p328" where 328 is the ordinal number of the pixel in the array. In FIG. 4B the peak of the reference line falls between two pixels. Normally this will be the case since the wavelengths of the spectrum cannot be located exactly by the finite steps of the wavelength drive motor 77 so that the reference line is exactly centered on a preselected pixel.

As an example, the preselection of pixel 328 for the reference peak location would substantially center the spectrum on the array in the Survey mode. This is an arbitrary selection. To exactly locate the actual reference peak position relative to the position of the preselected pixel, say pixel 328, the following computer approach is taken. The wavelength drive is first adjusted by computer commanded scanning so that the 656.1 nm deuterium line gives an intensity (energy) maximum as near the center of pixel 328 as possible. Denote the location of this maximum as pixel 328+x, where x is a number generally between 0 and 1. Let y give the intensity and let x give the position on the array measured from the center of pixel 328 and expressed in units of the pixel spacing. Pixels 328+x-1, 328+x and 328+x1 are thus located at x=-1, 0 and +1 respectively.

The intensity shape of the reference line can be expressed by fitting a quadratic equation to the intensity curve:

$$y = a_1 = a_2 x + a_3 x^2 \quad (1)$$

The peak occurs where
$$dy/dx = a_2 + 2a_3 x = 0 \quad (2)$$

So the peak is at $x = -a_2/2a_3$ (3)

If y has values of $y_-$, $y_o$, $y_+$ at $x = -1, 0, +1$ respectively then these three sets of points give three equations for the a's:

$$a_1 - a_2 + a_3 = y_- \quad (65)$$

$$a_1 = y_o \quad (4)$$

$$a_1 + a_2 + a_3 = y_+$$

solving
$$a_1 = y_o$$
$$a_2 = 0.5(y_+ - y_-) \quad (5)$$

$$a_3 = 0.5(y_+ + y_- - 2y_o)$$
and the peak occurs at
$$x_p = (y_- - y_+)/2(y_+ + y_- - 2y_o) \quad (6)$$

This value, showing the exact location on the array of the reference peak, will be determined by the computer and used subsequently to compute exact values of the wavelengths to be displayed. Since speed is an essential requirement of a practical scanning spectrophotometer a series of pixel values for "standard" wavelengths (eg. 190, 191.5, 193,—899.5, 901) will be precalculated by the computer and stored in a table for future reference in calculating the wavelengths to be displayed as corrected by the shift in peak location. The spacing of these standard wavelengths is substantially the same as that of the pixel spacing for the mode in operation.

3. Survey Mode Calculation

The determination for calibration purposes of the pixel on which a given wavelength falls must take into consideration the fact that the dispersion of the grating increases with wavelength as the spectrum is projected onto the flat face of the array. To a close approximation the pixel on which a given wavelength falls in the Survey mode may be given by the following quadratic expression which can be shown to be derivable from the well known grating equation.

$$p = \frac{c}{b} + \frac{ac^2}{b^3} + \frac{2a^2c^3}{b^5} \quad (7)$$

which is derived from
$$\lambda = 170.1 + 1.5604p - 0.0000752p^2 \quad (8)$$
where
a = 0.0000752
b = 1.5064
c = λ + d − 170.1
d = 656.1 minus wavelength at center of pixel 328

The constants above have been found to give the best fit and location for the spectrum in the Survey range based on the dispersion determined from the well known grating equations and the monochromator geometry. If d is small $$p = \frac{c_o}{b} + \frac{ac_o^2}{b^3} + \frac{2a^2c_o^3}{b^5} + \frac{d}{b} = p_o + \frac{d}{b} \quad (7a)$$

where $c_o = \lambda - 170.1$

The calculation of d is performed by the computer during the Survey Mode calibration. A brief outline of this routine follows.

a. On receiving the Survey Mode Wavelength Calibration command the computer positions the 656.1 nm deuterium line as close to the center of pixel 328 as the wavelength drive permits. To do this the software routine causes the wavelength drive motor to drive stepwise rapidly toward higher wavelength until the peak passes pixel 328, then return to below 328 and again step slowly this time upward until the peak is located to within one or two pixels of pixel 328. The wavelength drive then stops.

b. The array is scanned.
c. The pixel of maximum intensity within, say ±3 pixels of 328 is determined. 328 is subtracted from the determined pixel number and the result is stored as x.
d. The intensities of the pixels at 328+x−1, 328+x and 328+x+1 are then stored as $y_-$, $y_o$ and $y_+$ respectively.
e. $X_p$ is calculated using formula (6).
f. $d/b = x + x_p$.
g. To speed up subsequent computations, $p_o$ is computed for each standard wavelength and stored in memory.
h. d/b is added to each $p_o$ entry after wavelength calibration.

4. High Precision Mode Calibration

The calibration procedure in the High Precision mode is similar to that in the Survey mode. The differences can best be shown by comparison with the brief computer routine which follows.
a. On receiving the High Precision Mode Wavelength Calibration command the computer positions the 656.1 deuterium line after the High Precision grating is set to the 650 nm center position (600−700 nm range) setting the deuterium line to the center of pixel 278 as closely as the wavelength drive permits.
b. The array is scanned.
c. X is determined by subtracting 278 from the number of the pixel of maximum intensity and stored.
d. $X_p$ and d/b are computed as in the Survey mode.
e. The standard wavelengths in the High Precision mode are 0.25 nm apart. $p_o$ is computed from equation (7a) for each standard wavelength and stored in memory, a table for each High Precision range being computed. The constants a, b and c are chosen to give the best fit to the dispersion in each range as determined form the grating equations and the monochromator geometry.
f. d/b will be added to each $p_o$ entry after wavelength calibration.

The foregoing initialization routine is not bound to the order of calibration commands outlined to be effective, and either of the routines can be called up separately by operator command or by the computer if it detects a warning signal from a built-in error detection flag. The automatic sequence as given is advantageous in terms of speed in accomplishing the search routines. When executing the calibration routines the computer, if error is found, will recalculate the correction tables. If any step in the routine cannot be performed an error message, eg. "Reference Peak Not Found", will be displayed.

In the preferred embodiment the calibration procedures outlined above locate with required accuracy the position of a known reference, the 656.1 nm deuterium line, with reference for each mode to a preselected pixel of the array and generates wavelength correction tables accordingly for the rest of the scale range. The validity of the rest of the scale is established by preset mechanical constants such as the length of the wavelength arm 67 (FIG. 2), the pitch of the wavelength drive screw 75, and other mechanical and optical constants which have been carefully designed to stay constant in ways familiar to one skilled in the art. Should, however, greater accuracy demands call for further wavelength verification at the cost of greater program and structural complexity, an additional wavelength reference source such as a low pressure mercury arc might be disposed so as to provide an alternative optical beam through the monochromator system. With this source reference lines such as 253.65 nm, 365.01 nm, 435.8 nm, 546.1 nm, the third order line 761.0 nm, and the second order line 871.6 nm would be available to provide added calibration checks for each of the other six ranges of the High Precision mode in addition to the range previously discussed containing the 656.1 nm deuterium line. A similar digital calibration routine can be set up for each of these additional lines to extend automatic calibration to each individual range. Note also that the zero order may be made one of the above series of references if slope correction by computer controlled adjustment of the wavelength error is deemed desirable.

Although a certain particular embodiment of the invention has been herein disclosed for purposes of explanation, various modifications thereof, after study of the specification, will be apparent to those skilled in the art to which the invention pertains, and reference should accordingly be had to the appended claims in determining the scope of the invention.

What is claimed is:

1. A digital wavelength calibration system for a spectrophotometer comprising, in combination:
   a photodiode array forming an output detector for said spectrophotometer and having an ordered number of spaced pixels, each pixel being identifiable by an ordinal number;
   a light source for generating at least one reference emission line of known peak wavelength;
   means for causing the peak of said reference line to fall in close proximity to the center of a preselected pixel of said photodiode array;
   peak location means for computing the exact position data of said peak relative to said pixel center in terms of pixel spacing and the ordinal number of said preselected pixel and for retaining said position data for subsequent wavelength computation;
   wavelength identification means for computing the numerical relationship data of the ordinate number of each pixel to the wavelength falling on that pixel and for retaining said relationship data for subsequent correlation with data generated by said pixel, and
   means for computational processing and display of said pixel generated data correlated with the associated wavelength value.

2. A digital wavelength calibrating system according to claim 1 wherein said means for causing the peak of said reference line to fall in close proximity to the center of a preselected pixel includes mechanical interchange means for placing one of a plurality of diffraction gratings into position for dispersing the optical beam through the spectrophotometer when so directed by a programmed calibration routine.

3. A digital wavelength calibration system claim 2 further comprising means for controlling in preselected sequence a multiplicity of interchangeable filters and shutters in cooperation programmed calibration routine.

4. A digital wavelength calibratopm system according to claim 1 wherein said calibration system is connected to a grating spectrophotometer having at least one diffraction grating for dispersion.

5. A digital wavelength calibration system according to claim 4 wherein said at least one diffraction grating defines a zero order and the zero order of said at least one diffraction grating is also used as a reference line.

6. A digital wavelength calibration system according to claim 1 wherein said peak location means computes said position data based on a quadratic fit to the intensity envelope of said reference line.

7. A digital wavelength calibration system according to claim 1 wherein said wavelength identification means computes said numerical relationship data based on a quadratic fit to pixel ordinal number vs wavelength relationship in the grating spectrum spread across the face of said array.

8. A digital wavelength calibration system according to claim 1 wherein said light source is a deuterium arc lamp generating a 656.1 line and said reference emission line is the 656.1 line of said deuterium arc lamp.

* * * * *

UNITED STATES PATENT AND TRADEMARK OFFICE
CERTIFICATE OF CORRECTION

PATENT NO. : 4,692,883

DATED : Sep. 8, 1987

INVENTOR(S) : Michael R. Nelson, Roy E. Boostrom, Jerry E. Cahill and Tsong Hwang It is certified that error appears in the above-identified patent and that said Letters Patent are hereby corrected as shown below:

Column 10

Line 58, after "system" insert --according to--;

Line 61, after "cooperation" insert --with said--;

Line 63, change "calibratopm" to --calibration--.

Signed and Sealed this

Twenty-sixth Day of April, 1988

Attest:

DONALD J. QUIGG

Attesting Officer     Commissioner of Patents and Trademarks